United States Patent Office 3,526,157
Patented Sept. 1, 1970

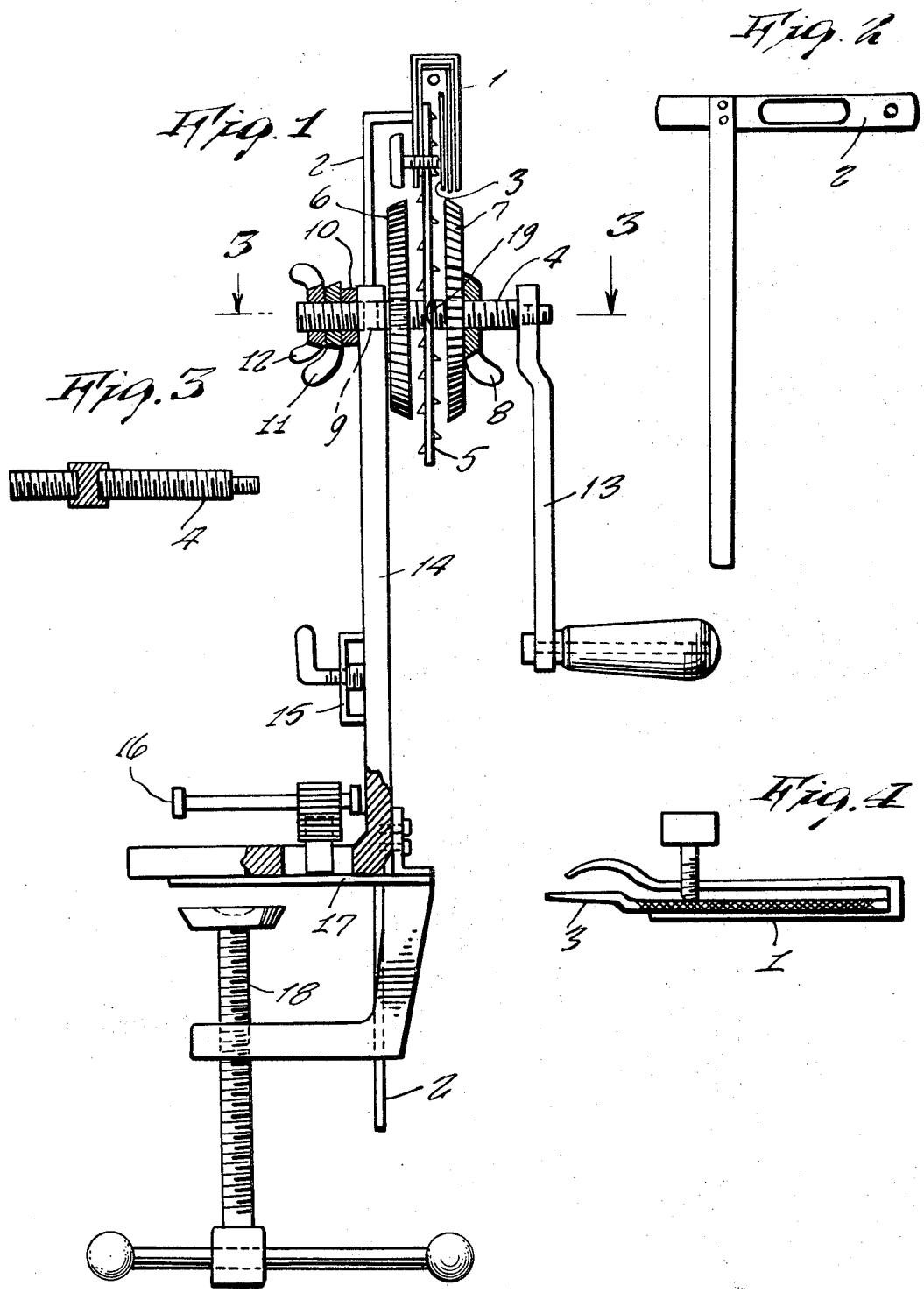

3,526,157
COMBINATION OF CIRCULAR SAW JOINTER AND VISE
Ezra Rachal, 303 Powell Ave., Monroe, La. 71201
Filed Oct. 23, 1967, Ser. No. 677,326
Int. Cl. B23d 63/08
U.S. Cl. 76—48          1 Claim

ABSTRACT OF THE DISCLOSURE

Apparatus which can be used both in jointing circular saw blades and in filing same.

SUMMARY OF THE INVENTION

In my invention, a circular saw blade can be detachably mounted in a nut secured to a handle via a crank whereby when the handle is turned, the blade will be rotated backwards in proper position for jointing. A file secured in a file holder is held against the blade during this process and the tips of the teeth are jointed.

The blade is then shifted in position to be held in suitable position for filing the teeth to complete the process.

BRIEF DESCRIPTION OF THE DRAWINGS

FIG. 1 is a side view of my invention,
FIG. 2 is a side view of the jointer,
FIG. 3 is a view through 3—3 in FIG. 1, and
FIG. 4 is a side view of the file holder.

DETAILED DESCRIPTION OF PREFERRED EMBODIMENT

Referring now to the drawings (FIGS. 1–4) file holder 1 is secured to saw jointer 2 and contains detachably file 3. Saw blade 5 is mounted on crankshaft 4 and is held in place by clamps 6 and 7. Wing nut 8 operates the clamps. Crank 4 turns in hub 9 freely. Nut 10 holds hub 9 in place. Adjustable nut 11 holds nut 10 in place and in turn is locked by lock nut 12. Crank and handle 13 are secured to shaft 4 for rotating same. The structure is supported by saw stand 14. Jointer holder 15 is secured thereto. Barrel bolt 16 locks base clamp 17 in place. A clamp bolt 18 is shown therewith. Various types of bushings 19 can be used with different types of blade arbors.

Note there is only four different parts of this invention to be dismounted and mounted including the bushing 19, for different types of arbors.

Note the saw blade 5 is mounted opposite the cutting path. This means the saw blade will turn backwards, while turning the crank 13, which is the proper way for the saw blade to be jointed.

With this device it only takes about twenty minutes to set joint and file a saw blade. This device will take a 5½-inch saw blade up to a 10-inch blade. This device does not set saw blades; therefore the saw blade has to be mounted in the saw vise after the blade is set.

The combination circular saw jointer and circular saw vise can be used as follows: clamp the base 17 by screwing the clamp bolt 18 to a 2 x 4 stock. Next, mount the bushing 19 onto crank shaft 4. Next, mount the saw blade 5 onto the crankshaft 4, be sure the bushing 19 fits snug in the saw blade arbor. Next mount clamp plate 7 onto the shaft 4. Next, screw half wing nut 8 against plate 7; this will bind the saw blade against plate 6. Next, mount crank handle on shaft 4 by means of a squire slot holder 15. Slide jointer 2 up or down according to the size of the saw blade that has to be jointed. Now the saw blade is ready to be jointed. Turn the crank 13 two or three rounds clockwise, while holding the file holder 1. Then lift file holder just a little. Push it away. This will clear the saw blade from the saw opening. Then turn the crank 13, slowly to see if the tips of the teeth has been jointed. Then dismount jointer 2, from jointer holder 15, slip crank 13 off lock wing nut 12 against 11. Tighten halt wing nut against plate 7. Then file every other tooth on the facing side of the saw blade. Do not remove the saw blade from the saw vise. Just simply loosen the barrel bolt 16, then turn the stand 14, one half round. This will put the other side of the saw blade facing the saw filer. Stand 14 can be adjusted by sliding it towards the saw filer or from the saw filer which ever is preferred. The saw stand can be angled to the right or to the left by turning the stand 14, either way right or left.

The novel features and the operation of this device will be apparent from the foregoing description. While the device has been shown and the structure described in detail, it is obvious that this is not to be considered limited to the exact form disclosed, and that changes may be made therein within the scope and the spirit of the invention.

Having thus set forth and disclosed the nature of this invention, what is claimed is:

1. A circular saw jointer and vise comprising a vertical support with a mounting vise at its lower end and means for rotatably supporting a shaft at its upper end in combination with a horizontal shaft mounted in the said upper end having a crank and handle secured to the shaft end remote from the support, including a bushing on said shaft adapted to be mounted in the arbor of a saw blade, including a pair of disc clamps mounted on the shaft on both sides of the bushing and a nut mounted on the shaft for securing the clamps against the blade in further combination with a file holder adjustably mounted on the support adjacent the blade periphery, said file holder including a file resiliently mounted adjacent the saw teeth and an adjusting screw mounted at right angles to the file for adjusting the space between the blades and file, said shaft including a hub mounted rotatably in the support in combination with means for securing the shaft on the support mounted on the side of the shaft remote from the blade.

References Cited

UNITED STATES PATENTS

| | | | |
|---|---|---|---|
| 1,043,470 | 11/1912 | Sellers | 76—48 |
| 1,051,153 | 1/1913 | Nelson | 76—48 |
| 2,617,317 | 11/1952 | Oliver | 76—48 |

BERNARD STICKNEY, Primary Examiner